United States Patent
Tazoe

(10) Patent No.: US 8,059,872 B2
(45) Date of Patent: Nov. 15, 2011

(54) FINGERPRINT IMAGE FORMING APPARATUS, FINGER MOVEMENT AMOUNT CALCULATION METHOD, AND FINGERPRINT IMAGE FORMING METHOD

(75) Inventor: Naoki Tazoe, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 1081 days.

(21) Appl. No.: 11/895,669

(22) Filed: Aug. 27, 2007

(65) Prior Publication Data

US 2008/0317290 A1 Dec. 25, 2008

(30) Foreign Application Priority Data

Jun. 19, 2007 (JP) .................................. 2007-161708

(51) Int. Cl.
*G06K 9/00* (2006.01)
(52) U.S. Cl. ........ 382/126; 382/107; 382/124; 382/125; 340/5.53; 356/71; 713/186; 283/68; 283/69
(58) Field of Classification Search .................. 382/107, 382/124–127; 340/5.53, 5.83; 356/71; 713/186; 283/68, 69
See application file for complete search history.

(56) References Cited

U.S. PATENT DOCUMENTS

| | | | | |
|---|---|---|---|---|
| 6,002,815 | A * | 12/1999 | Immega et al. ............... | 382/312 |
| 6,459,804 | B2 * | 10/2002 | Mainguet ..................... | 382/124 |
| 7,162,058 | B2 * | 1/2007 | Mimura et al. ............... | 382/124 |
| 7,194,115 | B2 * | 3/2007 | Uchida .......................... | 382/124 |
| 7,289,649 | B1 * | 10/2007 | Walley et al. ................. | 382/124 |
| 2003/0002718 | A1 * | 1/2003 | Hamid ........................... | 382/124 |
| 2007/0009141 | A1 * | 1/2007 | Ikeda ............................. | 382/124 |
| 2007/0025601 | A1 * | 2/2007 | Cheng et al. .................. | 382/124 |

FOREIGN PATENT DOCUMENTS

| | | |
|---|---|---|
| JP | 10-091769 | 4/1998 |
| JP | 2002-216116 | 8/2002 |
| JP | 2007-29706 | 8/2007 |

OTHER PUBLICATIONS

Patent Abstract of JP 2007-029706 dated Aug. 2, 2007.
Patent abstracts of Japan of JP 10-091769 dated Apr. 10, 1998.
Patent abstracts of Japan of JP 2002-216116 dated Aug. 2, 2002.

* cited by examiner

*Primary Examiner* — Wesley Tucker
(74) *Attorney, Agent, or Firm* — Ladas & Parry LLP

(57) ABSTRACT

A disclosed apparatus for forming a fingerprint image includes a partial sensor configured to obtain partial images of a fingerprint of a finger moving over the partial sensor; a reference image storing unit configured to store a reference partial image; and an image difference calculating unit configured to calculate a reference image difference between the reference partial image and a first partial image, to calculate a current image difference between the reference partial image and a second partial image, to calculate an amount of movement and/or a position of the finger based on a ratio of the current image difference to the reference image difference, and to store the second partial image and/or the first partial image as parts of the fingerprint image to be formed if the amount of movement and/or the position of the finger is equal to or greater than a predetermined value.

5 Claims, 4 Drawing Sheets

FINGERPRINT IMAGE FORMING APPARATUS, FINGER MOVEMENT AMOUNT CALCULATION METHOD, AND FINGERPRINT IMAGE FORMING METHOD

BACKGROUND OF THE INVENTION

1. Field of the Invention

The present invention generally relates to a fingerprint image forming apparatus, a finger movement amount calculation method, and a fingerprint image forming method. More particularly, this invention relates to a fingerprint image forming apparatus including two line sensors, and a finger movement amount calculation method and a fingerprint image forming method used for the fingerprint image forming apparatus.

2. Description of the Related Art

There is a conventional fingerprint reading system that includes a sensor having a surface area smaller than that of a finger. Such a fingerprint reading system reads a fingerprint of a finger moving over the sensor portion by portion and reconstructs the image of the fingerprint from the read partial images (see, for example, patent document 1). A sensor that reads a fingerprint portion by portion is generally smaller than a two-dimensional sensor that can obtain an entire image of a fingerprint in one scan. Using such a small sensor makes it possible to reduce the size and costs of a fingerprint reading apparatus.

A fingerprint reading system disclosed in patent document 1 includes a line sensor for reading a fingerprint line by line and is configured to reconstruct the image of a fingerprint from lines of image data. One problem with a fingerprint reading system using a line sensor is that overlaps between lines of image data vary depending on the speed of a finger moving over the line sensor. In other words, if an image of a fingerprint is reconstructed by simply accumulating lines of image data, the length of the reconstructed image varies depending on the movement speed of the finger. Such variation in the length of a fingerprint image, for example, reduces the reliability of a personal identification system using fingerprints. Therefore, when forming a fingerprint image using a line sensor, it is important to accurately identify and remove overlaps between lines of image data.

Patent document 2 discloses a fingerprint reading apparatus including two line sensors. The disclosed finger print reading apparatus obtains the movement speed of a finger using the two line sensors, detects distortion of a fingerprint image from the movement speed, and removes overlaps between lines of image data based on the detected distortion.

[Patent document 1] Japanese Patent Application Publication No. 10-91769

[Patent document 2] Japanese Patent No. 3709344

One disadvantage of the configuration disclosed in patent document 2 is that it requires a rather large storage area to store lines of image data and therefore is not suitable for a small embedded system.

SUMMARY OF THE INVENTION

Embodiments of the present invention provide a fingerprint image forming apparatus, a finger movement amount calculation method, and a fingerprint image forming method that solve or reduce one or more problems caused by the limitations and disadvantages of the related art.

According to an embodiment of the present invention, an apparatus for forming a fingerprint image comprises a partial sensor including a first sensor and a second sensor that are configured to obtain partial images of a fingerprint of a finger moving over the partial sensor in a direction from the first sensor to the second sensor; a reference image storing unit configured to store a reference partial image obtained by the second sensor; and an image difference calculating unit configured to calculate a reference image difference between the reference partial image and a first partial image obtained by the first sensor, to calculate a current image difference between the reference partial image and a second partial image obtained by the second sensor, to calculate an amount of movement and/or a position of the finger based on a ratio of the current image difference to the reference image difference, and to store the second partial image and/or the first partial image as parts of the fingerprint image to be formed if the amount of movement and/or the position of the finger is equal to or greater than a predetermined value.

According to another embodiment of the present invention, an apparatus for forming a fingerprint image includes a partial sensor configured to obtain partial images of a fingerprint of a finger moving over the partial sensor; a partial image update position determining unit configured to calculate a partial image update position at which a partial image update is to be performed to store one or more of the partial images as parts of the fingerprint image to be formed; and a partial image updating unit configured to determine whether to perform the partial image update based on the partial image update position and an amount of movement and/or a position of the finger; wherein the partial image update position determining unit is configured to calculate a total difference between a total amount of movement or a cumulative position of the finger and a total length of the stored partial images and to calculate a next partial image update position so as to compensate for the total difference.

Another embodiment of the present invention provides a method of calculating an amount of movement and/or a position of a finger moving over a partial sensor including a first sensor and a second sensor in a direction from the first sensor to the second sensor. The method includes the steps of obtaining a first partial image of a fingerprint of the finger by the first sensor and a second partial image of the fingerprint by the second sensor; storing the second partial image as a reference partial image; calculating a reference image difference between the first partial image and the reference partial image; obtaining a current partial image by the second sensor; calculating a current image difference between the reference partial image and the current partial image; and calculating the amount of movement and/or the position of the finger based on a ratio of the current image difference to the reference image difference.

Still another embodiment of the present invention provides a method of forming a fingerprint image. The method includes the steps of obtaining, by a partial sensor, a partial image of a fingerprint of a finger moving over the partial sensor; determining whether to store the partial image as a part of the fingerprint image to be formed based on an amount of movement of the finger; calculating a difference between the length of the partial image and the amount of movement of the finger if the partial image is stored; and determining a position at which a next partial image is to be stored such that the difference between the length of the partial image and the amount of movement of the finger is compensated for.

DESCRIPTION OF THE PREFERRED EMBODIMENTS

Preferred embodiments of the present invention are described below with reference to the accompanying drawings.

Figure 1:
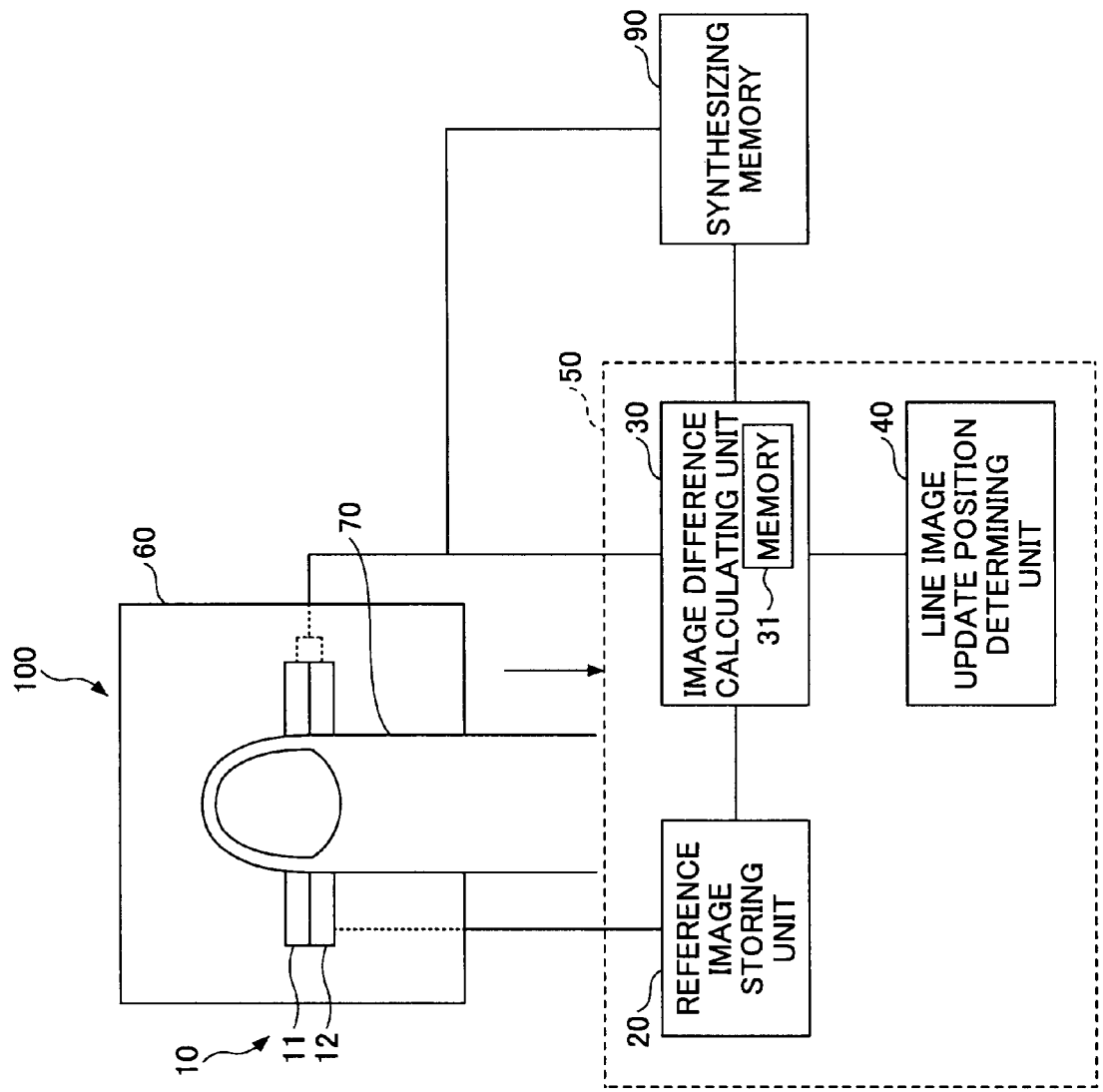
FIG. 1 is a schematic diagram illustrating a fingerprint image forming apparatus 100 according to an embodiment of the present invention.

FIG. 1 is a schematic diagram illustrating a fingerprint image forming apparatus 100 according to an embodiment of the present invention. As shown in FIG. 1, the fingerprint image forming apparatus 100 includes a partial sensor 10 and an arithmetic and control unit 50. The arithmetic and control unit 50 includes a reference image storing unit 20, an image difference calculating unit 30, and a line image update position determining unit 40 (may also be called a partial image update position determining unit). The arithmetic and control unit 50 may include various arithmetic units similar to those of a computer. The fingerprint image forming apparatus 100 may also include a support 60 for holding the partial sensor 10. Further, the fingerprint image forming apparatus 100 may include a synthesizing memory 90 for combining partial images and thereby generating an entire image of a fingerprint.

The partial sensor 10 scans a finger 70 moving over the partial sensor 10 and thereby obtains a fingerprint image of the finger 70. The finger 70 is moved, for example, in the direction of an arrow shown in FIG. 1. The partial sensor 10 may be implemented by any device that can detect ridges and grooves of a fingerprint and convert them into an image. Examples of such devices include a photodetector that responds to light and a capacitance sensor.

The partial sensor 10 has a shape of a rectangle and obtains partial images of the surface of the finger 70 while the finger 70 is moving. The fingerprint image forming apparatus 100 combines the obtained partial images and thereby forms an entire image of a fingerprint of the finger 70. In this embodiment, the partial sensor 10 includes a first line sensor 11 and a second line sensor 12 arranged in parallel with each other. As described later in detail, the fingerprint image forming apparatus 100 can accurately determine whether the amount of movement and/or the change of position of the finger 70 moving over the first and second line sensors 11 and 12 has reached or exceeded one line (corresponding to a distance covered by the first or second line sensor 11 or 12).

The first and second line sensors 11 and 12 are not limited to linearly-shaped sensors but may also be implemented by a sensor composed of two or more rows of pixels arranged in a rectangular shape. Further, each of the first and second line sensors 11 and 12 may be implemented by any type of sensor that has a surface area smaller than that of a finger and is able to obtain only a partial image of a fingerprint at a time.

The positions of the first and second line sensors 11 and 12 are determined relative to the movement direction of the finger 70. The first line sensor 11 is positioned upstream of the second line sensor 12 in the movement direction of the finger 70 and the second line sensor 12 is positioned downstream of the first line sensor 11 in the movement direction of the finger 70. When the finger 70 is to be moved in the opposite direction (upward in FIG. 1), the relative positions of the first and second line sensors 11 and 12 may be reversed. Also, the fingerprint image forming apparatus 100 may include a mechanism to determine the movement direction of the finger 70 and to change the functions of the first and second line sensors 11 and 12 according to the determined movement direction. In other words, the fingerprint image forming apparatus 100 of this embodiment can be used regardless of the movement direction of the finger 70 by switching the functions of the first and second line sensors 11 and 12. In this embodiment, for descriptive purposes, it is assumed that the first line sensor 11 is positioned closer to the tip of the finger 70, the second line sensor 12 is positioned closer to the base of the finger 70, and the finger 70 is moved in a direction from the first line sensor 11 to the second line sensor 12. However, as described above, the relative positions of the first and second line sensors 11 and 12 may be switched as necessary.

The support 60 holds the first and second line sensors 11 and 12 so as to make it easier to sweep the sensors with the finger 70. The support 60 may be made of any material and may have any shape.

The reference image storing unit 20 stores a line of image data (hereafter called a "line image") of a fingerprint obtained by the second line sensor 12 at predetermined time. The reference image storing unit 20 is implemented by, for example, a rewritable memory such as a volatile memory. The line image stored in the reference image storing unit is used as a reference line image (may also be called a reference partial image) to determine whether the finger 70 has moved one line. Details of this mechanism are described later.

In this embodiment, the partial sensor 10 includes the first and second line sensors 11 and 12 and images obtained by the first and second line sensors 11 and 12 are called "line images". However, the partial sensor 10 may be composed of sensors other than line sensors and images obtained by the constituent sensors may be called "partial images".

The image difference calculating unit 30 compares two line images and calculates an image difference. An image difference indicates a degree of dissimilarity between two line images. A larger image difference value indicates a larger difference between two line images and a smaller image difference value indicates a smaller difference between two line images. When two images are identical, the image difference value becomes 0.

Various methods may be used to calculate an image difference. For example, an image difference may be calculated by obtaining differences between signal values of pixels at corresponding coordinates of two line images scanned by the first and second line sensors 11 and 12 and by totaling the differences of all the pixels of the two line images. An image difference may be calculated not only between line images obtained at the same point in time but also between a line image stored in the reference image storing unit 20 and a line image obtained later while the finger 70 is moving.

The image difference calculating unit 30 may include a memory 31 for storing a calculated image difference. The fingerprint image forming apparatus 100 of this embodiment is configured to obtain a reference image difference, for example, at start time and to determine whether the finger 70 has moved one line or more based on the reference image difference. The memory 31 is used to store the reference image difference.

When it is determined that the finger 70 has moved one line or more, the line image update position determining unit 40 calculates the next position (hereafter called the next line image update position) where whether the finger 70 has moved one line or more is determined and a line image(s) is stored in the synthesizing memory 90 (this process is hereafter called a line image update). Details of the calculation by the line image update position determining unit 40 are described later.

When the image difference calculating unit 30 determines that the finger 70 has moved one line or more, it stores a current line image(s) obtained by the first line sensor 11 and/or the second line sensor 12 in the synthesizing memory 90. The stored line images are combined to generate the entire fingerprint image of the finger 70. The synthesizing memory 90 may be implemented by any type of memory.

Figure 2:
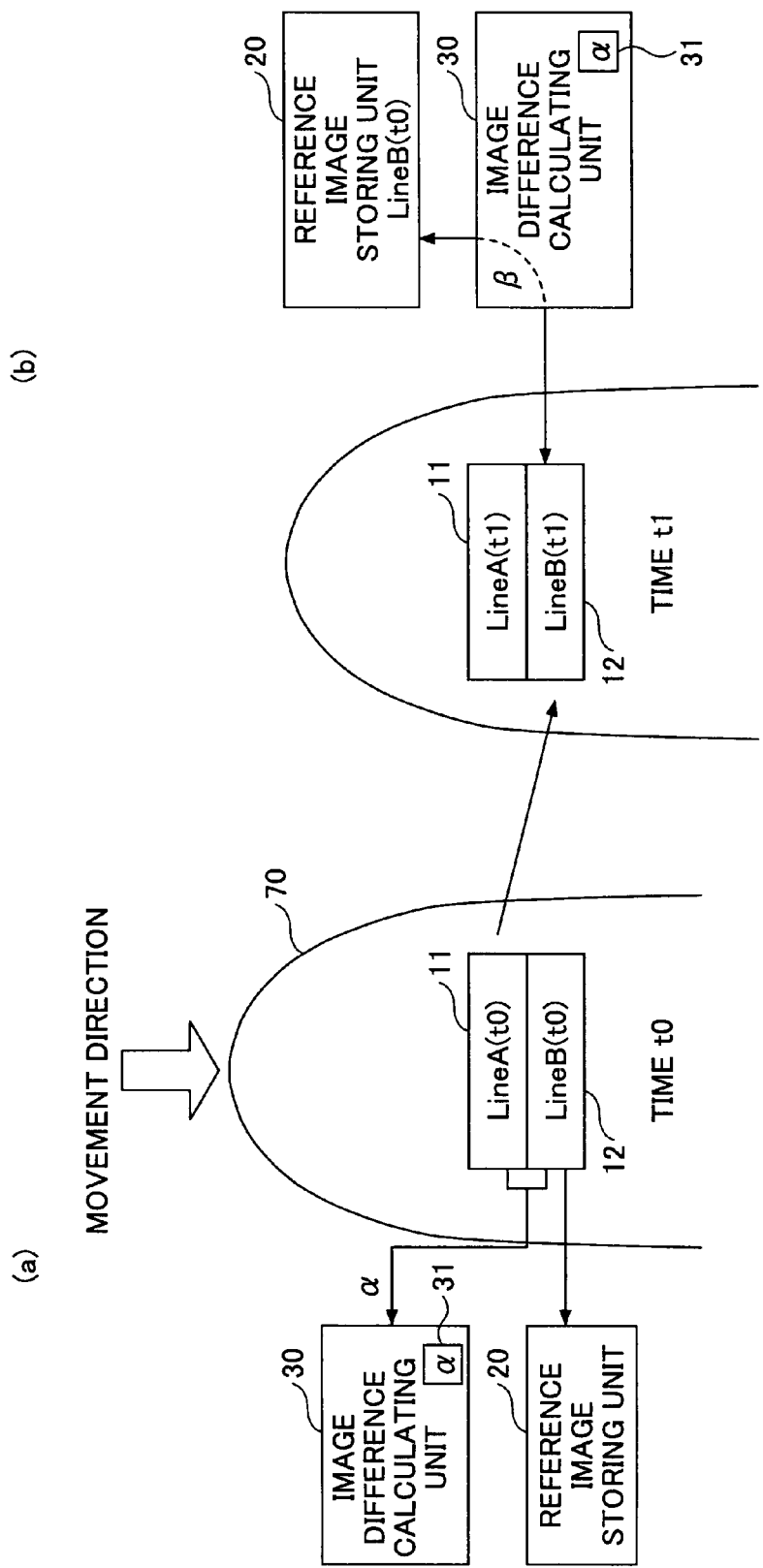
FIG. 2 is a drawing used to describe an exemplary method of calculating the amount of movement of a finger in the fingerprint image forming apparatus 100.

An exemplary method of calculating the amount of movement of the finger 70 in the fingerprint image forming apparatus 100 is described below with reference to FIG. 2. FIG. 2 is a drawing used to describe the exemplary method of calculating the amount of movement of the finger 70.

As shown in FIG. 2, the first line sensor 11 and the second line sensor 12 are arranged parallel and adjacent to each other and the finger 70 is moved in the direction of an arrow. FIG. 2(*a*) shows the position of the finger 70 at time t0 with respect to the first and second line sensors 11 and 12. In FIG. 2(*a*), LineA(t0) indicates a line image of a fingerprint of the finger 70 obtained at time t0 by the first line sensor 11 and LineB(t0) indicates a line image of the fingerprint obtained at time t0 by the second line sensor 12. The line image LineB(t0) is stored as a reference line image in the reference image storing unit 20. At the same time, the image difference calculating unit 30 calculates an image difference between the line images LineA (t0) and LineB(t0) by comparing them and stores the image difference as a reference image difference α in the memory 31.

As time passes, the finger 70 moves downward (in the direction of the arrow) and, consequently, the first and second line sensors 11 and 12 scan different portions of the fingerprint of the finger 70. At time t1 when the finger 70 has moved one line (corresponding to a distance covered by the first or second line sensor 11 or 12), the line image LineA(t0), which is obtained by the first line sensor 11 at time t0, is obtained again by the second line sensor 12.

FIG. 2(*b*) shows the position of the finger 70 at time t1 with respect to the first and second line sensors 11 and 12. In FIG. 2(*b*), LineA(t1) indicates a line image of the fingerprint of the finger 70 obtained at time t1 by the first line sensor 11 and LineB(t1) indicates a line image of the fingerprint obtained at time t1 by the second line sensor 12. As described above, the line images LineA(t0) and LineB(t1) are the same and therefore can be expressed by the following formula (A):

$$LineA(t0) = LineB(t1) \quad (A)$$

From the formula (A), the following formula (B) can be deduced ($\Leftrightarrow$ indicates an image difference)

$$LineA(t0) \Leftrightarrow LineB(t0) = LineB(t1) \Leftrightarrow LineB(t0) = \alpha \quad (B)$$

According to the formula (B) above, whether the finger 70 has moved one line can be determined by comparing the reference line image LineB(t0) and a current line image obtained by the second line sensor 12. For example, if the image difference between the reference line image LineB(t0) and the line image LineB(t1) obtained at time t1 equals the reference image difference α, it indicates that the finger 70 has moved one line. In other words, if a current image difference β between the reference line image LineB(t0) and a current line image becomes equal to the reference image difference α (α=β), it indicates that the amount of movement of the finger 70 has reached one line.

The current image difference β changes during a period between time t0 and time t1. Needless to say, a current image difference β (t0) at time t0 between the line image LineB(t0) and the reference line image LineB(t0) is 0 as expressed by the following formula (C):

$$\beta(t0) = LineB(t0) \Leftrightarrow LineB(t0) = 0 \quad (C)$$

Also, a current image difference β (t) between the reference line image LineB(t0) and a current line image LineB(t) obtained by the second line sensor 12 at time t between time t0 and time t1 (t0<t<t1) is expressed by the following formulas (D) and (E):

$$0 < LineB(t) \Leftrightarrow LineB(t0) < LineB(t1)$$
$$\Leftrightarrow LineB(t0) = LineA(t0) \Leftrightarrow LineB(t0) (t0 < t < t1) \quad (D)$$

$$0 = \beta(t0) < \beta(t) < \beta(t1) = \alpha (t0 < t < t1) \quad (E)$$

In summary, the reference image difference α is the difference between the line image LineA(t0) obtained by the first line sensor 11 at time t0 and the line image LineB(t0) obtained by the second line sensor 12 at time t0; and the current image difference β is the difference between the reference line image LineB(t0) and the current line image LineB(t) obtained by the second line sensor 12 at time t. When the current image difference β becomes equal to or larger than the reference image difference α (β≧α), it indicates that the finger 70 has moved one line or more. After movement of one line of the finger 70 is determined, the reference line image LineB(t0) and the reference image difference α are updated so that the next one-line movement of the finger 70 from the current position (hereafter called a current line image update position) can be determined.

Among the line images obtained as described above, line images obtained when the current image difference β is less than the reference image difference α (when the amount of movement of the finger 70 is less than one line) are discarded and line images obtained when the current image difference β is equal to or larger than the reference image difference α (when the amount of movement of the finger 70 is equal to or larger than one line) are stored. This means that overlaps between line images are removed along with the progress of a fingerprint image forming process.

Next, an exemplary method of forming a fingerprint image by the fingerprint image forming apparatus 100 is described. In the exemplary method, variation in the length of a fingerprint image is prevented based on the reference image difference α, the current image difference β, and an image input cycle.

Normally, in a device using a line sensor, line image data obtained by the line sensor can be input into the device only at a certain image input cycle because of limits of the device performance such as data processing speed and data transmission speed. Although an image input cycle varies depending on the characteristics of a device and a line sensor, it is assumed here that the image input cycle of the fingerprint image forming apparatus 100 is about 100 μs.

In the exemplary method of calculating the amount of movement of the finger 70 described above, when the movement speed of the finger 70 is slow, the current image difference β changes slowly. This means that the amount of movement of the finger 70 in an image input cycle is small and, therefore, it is easy to determine the timing when the current image difference β becomes equal to the reference image difference α. In other words, when the movement speed of the finger 70 is slow, it is rather easy to form an accurate fingerprint image. However, when the movement speed of the finger 70 is fast, the amount of movement of the finger 70 in an image input cycle becomes large. In this case, it is possible that the current image difference β detected at time t1 is larger than the reference image difference α.

According to the results of an experiment performed by the present inventor, the current image difference β changes substantially linearly during the time period between time t0 and time t1. This means that the ratio of β to α (β/α) indicates the ratio of the current movement amount of the finger 70 to one line (i.e. when β/α is 1 or larger, the amount of movement and/or the position of the finger 70 is equal to or greater than one line). In other words, the current amount of movement and/or the current position of the finger 70 can be estimated based on the ratio β/α.

The fingerprint image forming apparatus 100 of this embodiment is configured to estimate the amount of movement and/or the position of the finger 70 and determine the next line image update position based on the ratio β/α.

The line image update position determining unit 40 of the fingerprint image forming apparatus 100 of this embodiment adjusts the next line image update position according to the amount of movement of the finger 70 at the current line image update position. An exemplary line-image-update-position adjusting method by the line image update position determining unit 40 is described below with reference to FIG. 3. As described above, the image difference calculating unit 30 calculates the current image difference β, which corresponds to the amount of movement and/or the position of the finger 70, and determines whether the finger 70 has moved one line or more based on the current image difference β. The line image update position determining unit 40 determines the next line image update position based on the current image difference β.

Figure 3:
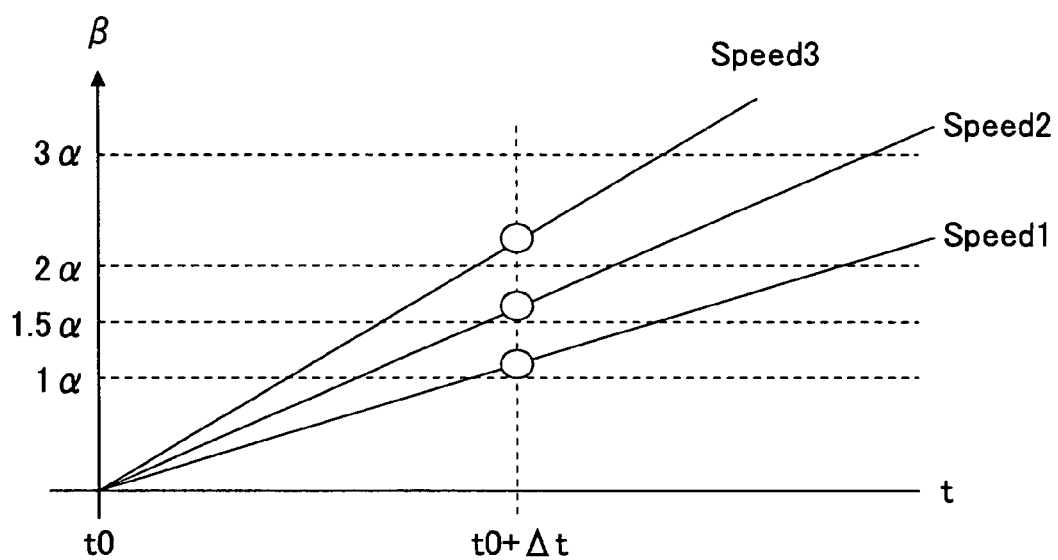
FIG. 3 is a graph showing current image differences β at time t obtained by moving a finger 70 at various speeds.

FIG. 3 shows the current image differences β at time t=t0+Δt (when one image input cycle Δt has elapsed from time t0) obtained by moving the finger 70 at various speeds (speed 1 through speed 3).

As shown in FIG. 3, when the finger 70 is moved at speed 1, the current image difference β (that corresponds to the amount of movement and/or the position of the finger 70) at time t=t0+Δt is expressed by the formula $1\alpha < \beta < 1.5\alpha$. In this example, it is assumed that the current image difference β at time t=t0+Δt in the case of speed 1 is $1.2\alpha$. Since the current image difference β is larger than $1\alpha$, a line image update is performed.

Ideally, a line image update is performed when the current image difference β is equal to the reference image difference α. When β=α is true in all line image updates, a fingerprint image can be accurately formed by sequentially storing line images obtained by the second line sensor 12 in the synthesizing memory 90 and by combining the stored line images. (In this embodiment, it is also assumed that the synthesizing memory 90 can store images only in units of lines (in integral multiples of one line)).

However, in actual cases, the current image difference β may become larger than $1\alpha$ with certain combinations of the image input cycles Δt and the movement speeds of the finger 70. For example, in the case of speed 1, a line image update is performed at time t=t0+Δt when the current image difference β is $1.2\alpha$ ($\alpha$=1 line) and the amount of movement of the finger 70 is 1.2 lines. In this case, if one line is simply added to the current line image update position (1.2 lines), the next line image update position becomes 2.2 lines from the initial position at time t0. As a result, an extra movement amount of 0.2 lines is carried over to the next line image update time. More specifically, since the current image difference β at the next line image update time t=t0+2Δt also becomes $1.2\alpha$, the amount of movement of the finger 70 at time t=t0+2Δt becomes 2.4 lines in total. Meanwhile, at time t=t0+2Δt, only two line images are present in the synthesizing memory 90 since line images can be stored only in units of lines. Accordingly, the difference (hereafter called a total difference) between the total amount of movement or the cumulative position (a position from the initial position) of the finger 70 and the total length of line images (i.e. the total data size of line images) in the synthesizing memory 90 becomes 2.4−2=0.4. This difference becomes greater if the above process is repeated in the same manner.

To obviate this problem, the line image update position determining unit 40 calculates the next line image update position taking into account the extra movement amount. For example, if the amount of movement of the finger 70 at the current line image update time is 1.2 lines as in the above case, the line image update position determining unit 40 decreases the value of the next line image update position by 0.2 lines. More specifically, the line image update position determining unit 40 sets a reference image difference α next for the next line at $0.8\alpha$ ($\alpha$=LineA(t0+Δt)⇔LineB(t0+Δt)). With the current image difference β of $1.2\alpha$ and the reference image difference α next of $0.8\alpha$ ($1.2\alpha+0.8\alpha=2\alpha$), the next line image update position becomes 2 lines from the initial position at time t0. Thus, the extra movement amount of 0.2 lines is compensated for and the next line image update is performed correctly at 2 lines from the initial position.

Referring back to FIG. 3, when the finger 70 is moved at speed 2, the current image difference β at time t=t0+Δt is expressed by the formula $1.5\alpha < \beta < 2\alpha$. Assuming that the current image difference β at time t=t0+Δt in the case of speed 2 is $1.8\alpha$, the amount of movement of the finger 70 becomes 1.8 lines. In this case, the difference between the total amount of movement or the cumulative position of the finger 70 and the total length of line images in the synthesizing memory 90 can be made smaller by storing two line images at once in the synthesizing memory 90 instead of one. If only one line image obtained by the second line sensor 12 is added to the synthesizing memory 90, the total difference between the total amount of movement of the finger 70 and the total length of line images in the synthesizing memory 90 becomes 1.8−1=0.8. On the other hand, if two line images obtained by the first and second line sensors 11 and 12 are added to the synthesizing memory 90, the total difference becomes 1.8−2.0=−0.2. Therefore, in this case, the line image update position determining unit 40 increases the value of the next line image update position by 0.2 lines. In other words, the line image update position determining unit 40 sets the reference image difference α next at $1.2\alpha$.

When the finger 70 is moved at speed 3, the current image difference β at time t=t0+Δt is expressed by the formula $2\alpha < \beta$. Assuming that the current image difference β at time t=t0+Δt in the case of speed 3 is $2.2\alpha$, the amount of movement of the finger 70 becomes 2.2 lines. In this case, two line images are stored at once in the synthesizing memory 90 and the total difference between the total amount of movement or the cumulative position of the finger 70 and the total length of line images in the synthesizing memory 90 becomes 2.2−2=0.2. Therefore, the line image update position determining unit 40 sets the reference image difference α next at $0.8\alpha$ as in the case of speed 1, and thereby decreases the value of the next line image update position by 0.2 lines.

In the exemplary methods described above with reference to FIGS. 1 through 3, the amount of movement and/or the position of the finger 70 is determined based on the reference image difference α and the current image difference β, and the next line image update position is calculated based on the amount of movement and/or the position of the finger 70. Alternatively, the amount of movement and/or the position of the finger 70 may be determined by a different unit without obtaining the reference image difference a and the current image difference β. For example, a line image updating unit (may also be called a partial image updating unit) that estimates the amount of movement and/or the position of the finger 70 and determines whether to perform a line image update may be provided in place of the image difference calculating unit 30. In other words, the fingerprint image forming apparatus 100 may include a line image updating unit that estimates the amount of movement and/or the position of the finger 70 and determines whether to perform a line image update; and the line image update position determining unit 40 that calculates the next line image update position based on the amount of movement and/or the position of the finger 70.

Figure 4:
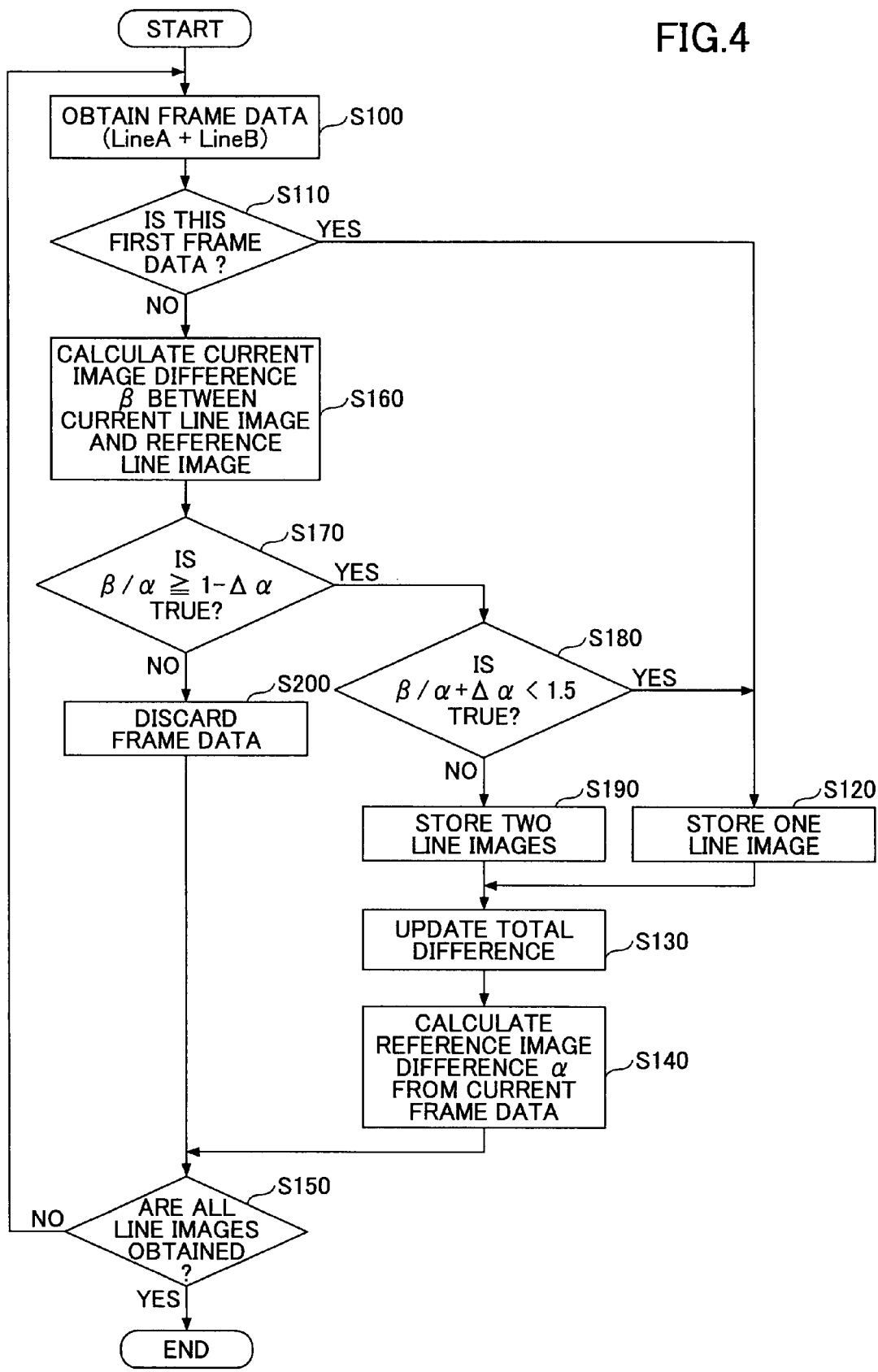
FIG. 4 is a flowchart showing an exemplary fingerprint image forming process performed by the fingerprint image forming apparatus 100.

An exemplary fingerprint image forming process (fingerprint image forming method) performed by the fingerprint image forming apparatus 100 is described below. FIG. 4 is a flowchart showing the exemplary fingerprint image forming process performed by the fingerprint image forming apparatus 100.

In step S100 of FIG. 4, frame data are obtained. Frame data in step S100 correspond to line images LineA(t0) and LineB(t0) obtained by the first and second line sensors 11 and 12 at time t0 described with reference to FIGS. 1 through 3 in the above embodiments.

In step S110, it is determined whether the frame data are obtained for the first time. If it is the first time, the process branches to step S120. If it is the second or subsequent time, the process proceeds to step S160.

In step S120, a line image update is performed to store one line image. This step corresponds to a process described in the above embodiments where the line image LineB(t0) obtained by the second line sensor 12 at time t0 is stored in the reference image storing unit 20 as a reference line image.

In step S130, the total length of stored line images (i.e. the total data size of stored line images) is obtained and the total difference between the total amount of movement of the finger 70 and the total length of stored line images is calculated (or updated). When step S130 is performed for the first time, however, since only the initial reference line image has been stored in step S120 and the finger 70 has not moved yet, the difference becomes 0.

In step S140, a reference image difference a is calculated based on the current frame data obtained in step S100. This step corresponds to a process described in the above embodiments where the reference image difference a between the line image LineA(t0) and the line image LineB(t0) obtained at time t0 by the first and second line sensors 11 and 12 is calculated by the image difference calculating unit 30.

In step S150, it is determined whether all line images for an entire fingerprint image are obtained. In other words, this step is to determine whether formation of a fingerprint image is completed. If all line images are obtained, the fingerprint image forming process by the fingerprint image forming apparatus 100 is terminated. If not, the process returns to step S100.

In step S100, new frame data are obtained by the partial sensor 10. In other words, new line images are obtained by the first and second line sensors 11 and 12.

In step S110, it is determined whether the frame data are obtained for the first time. If it is the second or subsequent time, the process proceeds to step S160.

In step S160, a current image difference β between the current line image obtained by the second line sensor 12 in step S100 and the reference line image stored in a previous line image update is calculated. This step corresponds to a process described in the above embodiments where the current image difference β is calculated by comparing the current line image LineB(t) obtained at time t by the second line sensor 12 and the reference line image LineB(t0) obtained at time t0. This step may be performed by the image difference calculating unit 30.

In step S170, whether the finger 70 has moved one line or more is determined taking into account the total difference. However, when step S170 is performed for the first time or when the total difference is 0, simply whether $β/α \geqq 1$ is true is determined. When a total difference $Δα$ is obtained in step S130, whether $β/α \geqq 1-Δα$ is true is determined. For example, when $Δα$ is 0.2, whether $β/α \geqq (1-0.2=0.8)$ is true is determined.

If $β/α+Δα$ is less than 1 (or if $β/α$ is less than $1-Δα$), the process proceeds to step S200 where the current line images are discarded. Then, the process proceeds to step S150 and the above steps are repeated.

If $β/α+Δα$ is equal to or larger than 1 (or if $β/α$ is equal to or larger than $1-Δα$), it is determined that the finger 70 has moved one line or more and the process proceeds to step S180.

In step S180, whether the amount of movement (or the position) of the finger 70 is less than 1.5 lines is determined taking into account the total difference. In other words, in step S180, whether to store one line image or two line images is determined.

When the total difference is 0, whether $β/α$ is less than 1.5 is determined. On the other hand, when there is a total difference $Δα$, whether $β/α+Δα$ is less than 1.5 is determined. For example, if $Δα$ is 0.2, whether $β/α+0.2$ is less than 1.5 is determined.

When $β/α+Δα$ is less than 1.5, the process proceeds to step S120. For example, when the total difference $Δα$ is 0.2 and $β/α$ is 1.2, $β/α+Δα$ becomes $1.2+0.2=1.4$ which is less than 1.5. In this case, the process proceeds to step S120 where one line image is stored in the synthesizing memory 90.

In the next step S130, the total difference $Δα$ is updated taking into account the number of line images added in the previous step. For example, when $β/α+Δα=1.4$ and one line image is added in step 120, the total difference $Δα$ becomes $1.4-1=0.4$. In step S140, the reference image difference a is calculated based on the current frame data. The total difference $Δα$ and the reference image difference α obtained in steps S130 and S140 are used in the next cycle of this fingerprint image forming process.

Referring back to step S180, when $β/α+Δα$ is equal to or larger than 1.5, the process proceeds to step S190. For example, when the total difference $Δα$ is 0.4 and $β/α$ is 1.4, $β/α+Δα$ becomes $1.4+0.4=1.8$ which is larger than 1.5. In this case, the process proceeds to step S190 where two line images are stored in the synthesizing memory 90. When $β/α+Δα$ is equal to or larger than 1.5, storing two lines makes the absolute value of the next total difference $Δα$ smaller.

In step 190, two line images are stored in the synthesizing memory 90 and the process proceeds to step S130.

In step S130, the total difference $Δα$ is updated taking into account the number of line images added in the previous step. For example, when $β/α+Δα=1.8$ and two line images are added in step 190, the total difference $Δα$ becomes $1.8-2=-0.2$. Step 140 and subsequent steps are substantially the same as described above. The total difference $Δα$ and the reference image difference a obtained in steps S130 and S140 are used in the next cycle of this fingerprint image forming process.

The arithmetic and control unit 50 of the fingerprint image forming apparatus 100 may be configured to perform the exemplary fingerprint image forming process as described above. The fingerprint image forming apparatus 100 including the arithmetic and control unit 50 configured as such makes it possible to accurately form a fingerprint image having a length that is close to the original length.

As described above, in the fingerprint image forming apparatus 100, the exemplary finger movement amount calculation method, and the exemplary fingerprint image forming method according to embodiments of the present invention, the reference image difference a which is dynamically calculated based on obtained line images of a fingerprint of the finger 70, is used instead of a fixed threshold to determine the amount of movement of the finger 70. Using the reference image difference a instead of a fixed threshold makes it possible to more accurately determine the amount of movement of the finger 70 and thereby to form a faithful fingerprint image. Also, embodiments of the present invention make it possible to prevent variation in the length of a fingerprint image caused by variation in the movement speed of the finger 70 and thereby to improve the reliability of a personal identification system using fingerprints. In the exemplary line-image-update-position adjusting method according to an embodiment of the present invention, the next line image update position is determined based on the amount of movement of the finger 70 at the current line image update position. This method makes it possible to accurately form a fingerprint image regardless of the image input cycle $\Delta t$ of a fingerprint image forming apparatus. In other words, the exemplary line-image-update-position adjusting method widens application of the present invention. For example, the method makes it possible to apply the present invention even to a device having irregular image input cycles.

The fingerprint image forming apparatus 100 may be configured to allow a total difference of up to 300%. For example, when $\beta/\alpha$ is 3, the arithmetic and control unit 50 stores two line images and increases the value of the next line image update position by 1 line (3−2=1). Meanwhile, if the total difference becomes too large, the linearity of a fingerprint image may be impaired. Still, this problem may be solved by compensating for the gaps in the fingerprint image by repeatedly using current line images as approximate images. This method, in turn, makes it possible to form a fingerprint image even when the movement speed of the finger 70 is high.

Embodiments of the present invention make it possible to form a faithful fingerprint image having a length that is close to the original length regardless of the movement speed of a finger.

Embodiments of the present invention provide a fingerprint image forming apparatus, a method of calculating the amount of movement of a finger, and a method of forming a fingerprint image that can accurately calculate the amount of movement and/or the position of a finger even when the movement speed of a finger varies and that can form a faithful fingerprint image having a length that is close to the original length based on the calculated amount of movement and/or the position of the finger.

Embodiments of the present invention provide a fingerprint image forming apparatus, a method of calculating the amount of movement of a finger, and a method of forming a fingerprint image that can accurately determine that a finger has moved one line or more and that can minimize variation in length of a fingerprint image even when the movement speed of a finger varies.

The present invention is not limited to the specifically disclosed embodiments, and variations and modifications may be made without departing from the scope of the present invention.

The present application is based on Japanese Priority Application No. 2007-161708, filed on Jun. 19, 2007, the entire contents of which are hereby incorporated herein by reference.

What is claimed is:

1. An apparatus for forming a fingerprint image, comprising:
a partial sensor including a first sensor and a second sensor that are configured to obtain partial images of a fingerprint of a finger moving over the partial sensor in a direction from the first sensor to the second sensor;
a reference image storing unit configured to store a reference partial image obtained by the second sensor; and
an image difference calculating unit configured to calculate a reference image difference between the reference partial image and a first partial image obtained by the first sensor, to calculate a current image difference between the reference partial image and a second partial image obtained by the second sensor, to calculate an amount of movement and/or a position of the finger based on a ratio of the current image difference to the reference image difference, and to store the second partial image and/or the first partial image as parts of the fingerprint image to be formed if the amount of movement and/or the position of the finger is equal to or greater than a predetermined value.

2. The apparatus as claimed in claim 1, wherein the image difference calculating unit is configured to determine that the amount of movement and/or the position of the finger is equal to or greater than one line, which corresponds to a distance covered by the first sensor or the second sensor, if the ratio of the current image difference to the reference image difference is 1 or larger, and to store the second partial image and/or the first partial image when so determined.

3. An apparatus for forming a fingerprint image, comprising:
a partial sensor configured to obtain partial images of a fingerprint of a finger moving over the partial sensor;
a partial image update position determining unit configured to calculate a partial image update position at which a partial image update is to be performed to store one or more of the partial images as parts of the fingerprint image to be formed; and
a partial image updating unit configured to determine whether to perform the partial image update based on the partial image update position and an amount of movement and/or a position of the finger;
wherein the partial image update position determining unit is configured to calculate a total difference between a total amount of movement or a cumulative position of the finger and a total length of the stored partial images and to calculate a next partial image update position so as to compensate for the total difference.

4. A method implemented on a computer having a processor and a memory coupled to the processor of calculating an amount of movement and/or a position of a finger moving over a partial sensor including a first sensor and a second sensor in a direction from the first sensor to the second sensor, the method comprising the steps of:
obtaining a first partial image of a fingerprint of the finger by the first sensor and a second partial image of the fingerprint by the second sensor;
storing the second partial image as a reference partial image;
calculating a reference image difference between the first partial image and the reference partial image;
obtaining a current partial image by the second sensor;

calculating a current image difference between the reference partial image and the current partial image; and calculating the amount of movement and/or the position of the finger based on a ratio of the current image difference to the reference image differene, wherein at least some of the steps are performed using the processor.

5. A method implemented on a computer having a processor and a memory coupled to the processor of forming a fingerprint image, comprising the steps of:

obtaining, by a partial sensor, a partial image of a fingerprint of a finger moving over the partial sensor;

determining whether to store the partial image as a part of the fingerprint image to be formed based on an amount of movement of the finger;

calculating a difference between the length of the partial image and the amount of movement of the finger if the partial image is stored; and determining a position at which a next partial image is to be stored such that the difference between the length of the partial image and the amount of movement of the finger is compensated for, wherein at least some of the steps are performed using the processor.

* * * * *